(No Model.) 9 Sheets—Sheet 1.
A. CAMPBELL.
BOTTLE WIRING MACHINE.
No. 404,028. Patented May 28, 1889.
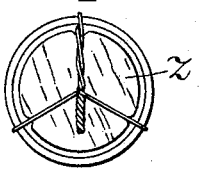
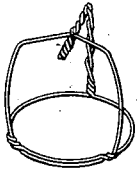
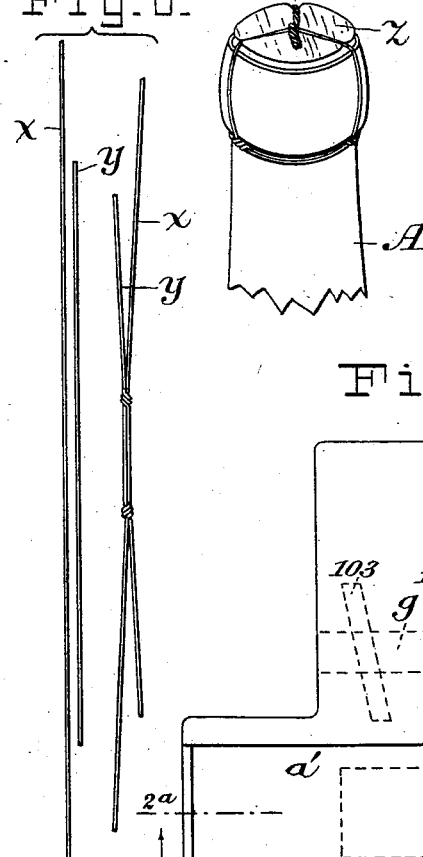
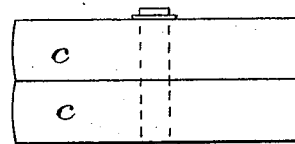
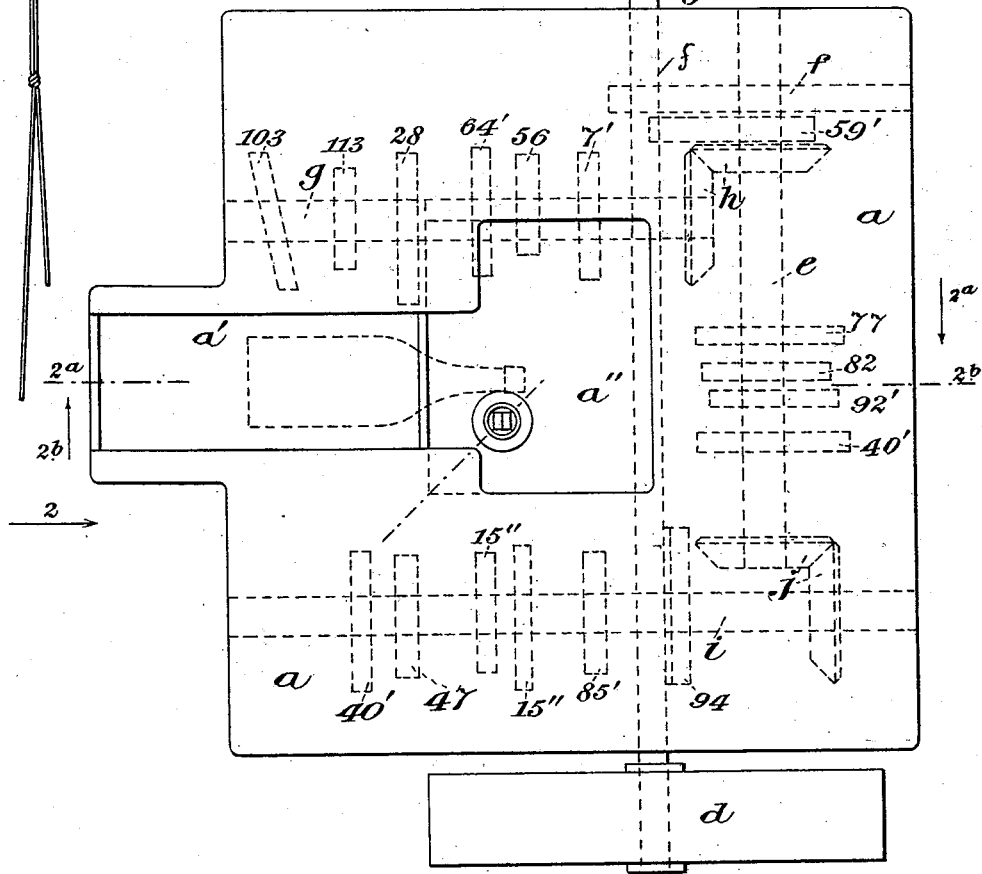
WITNESSES:
INVENTOR:
Andrew Campbell,
By Henry Connett
Attorney.

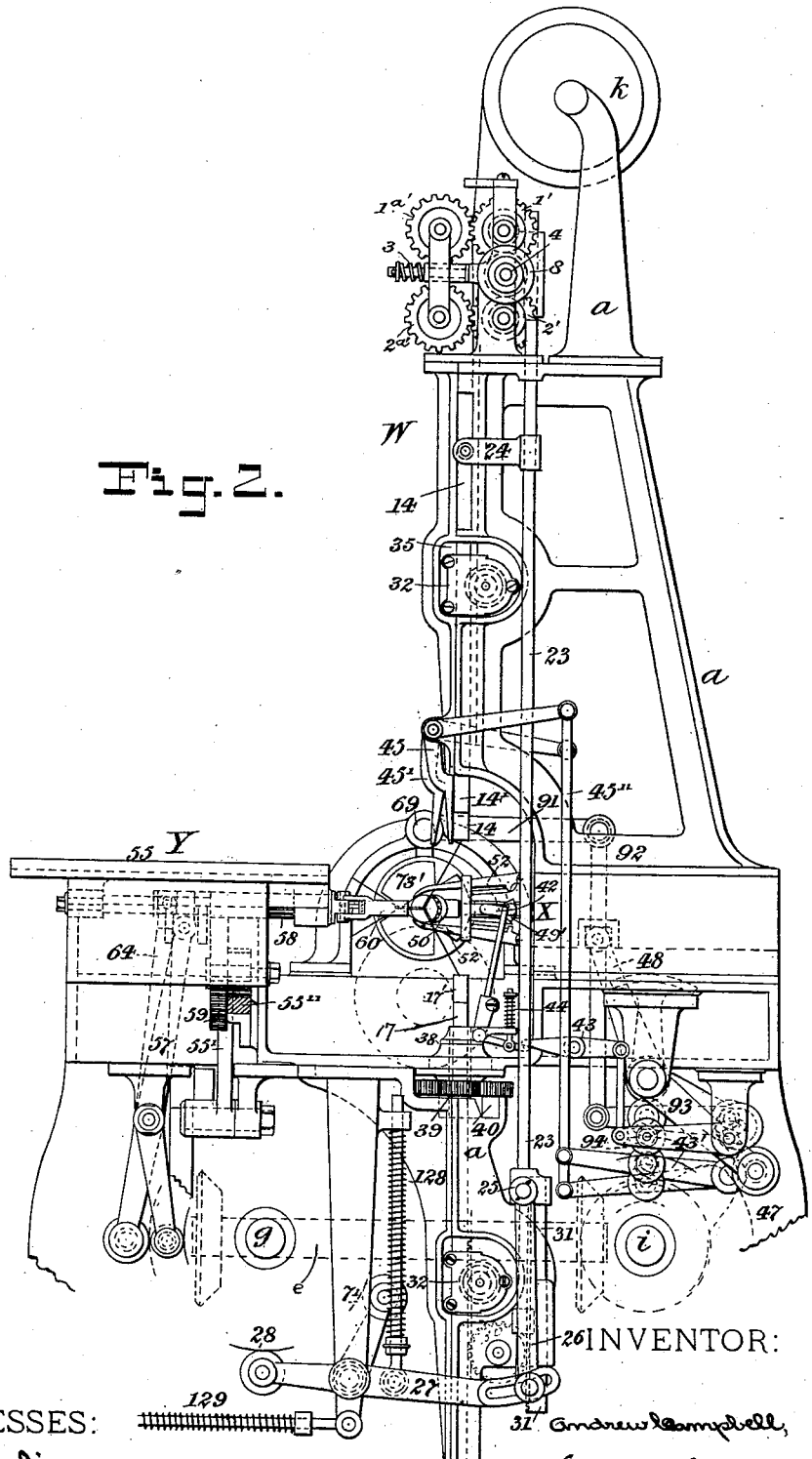

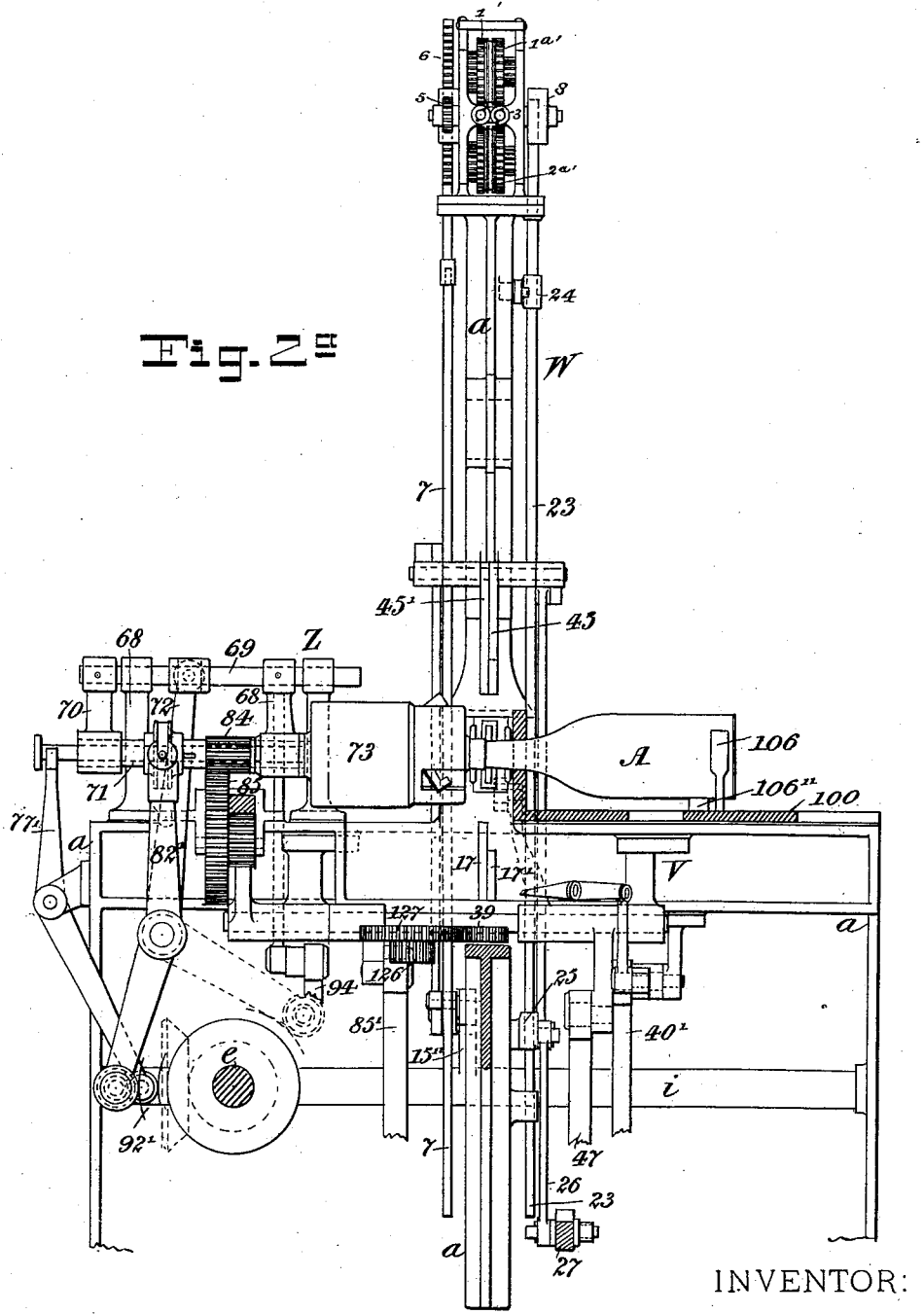

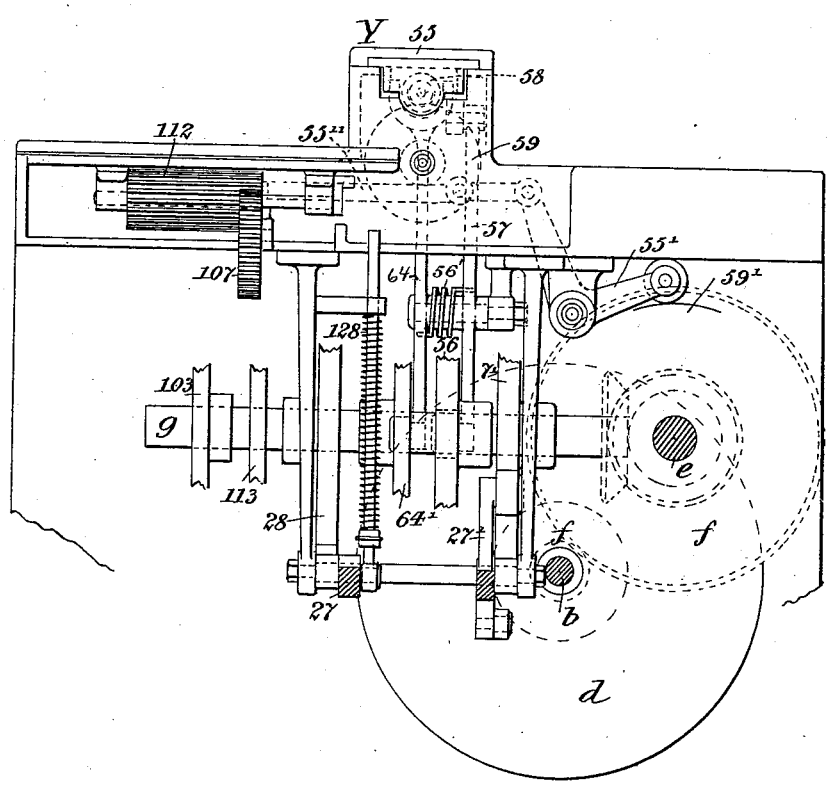

(No Model.) 9 Sheets—Sheet 5.
A. CAMPBELL.
BOTTLE WIRING MACHINE.
No. 404,028. Patented May 28, 1889.
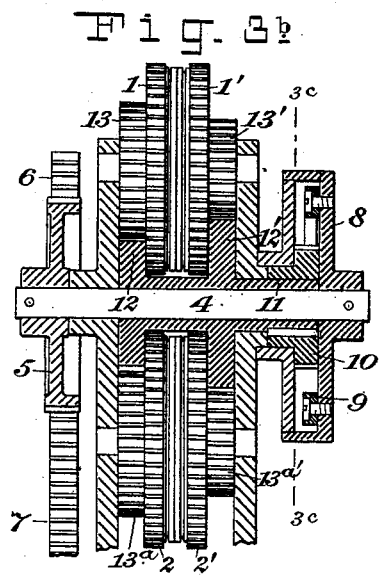
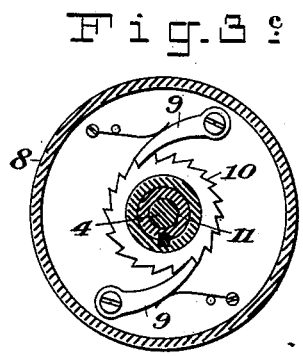
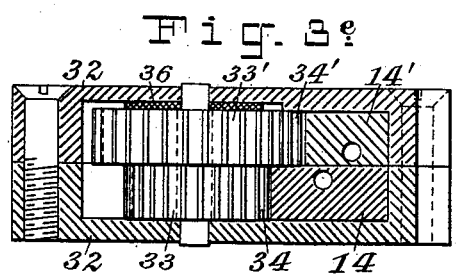
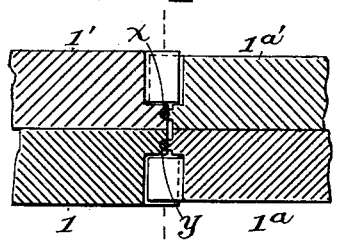
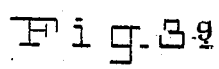
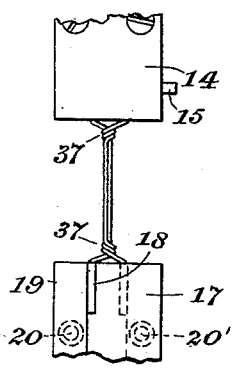
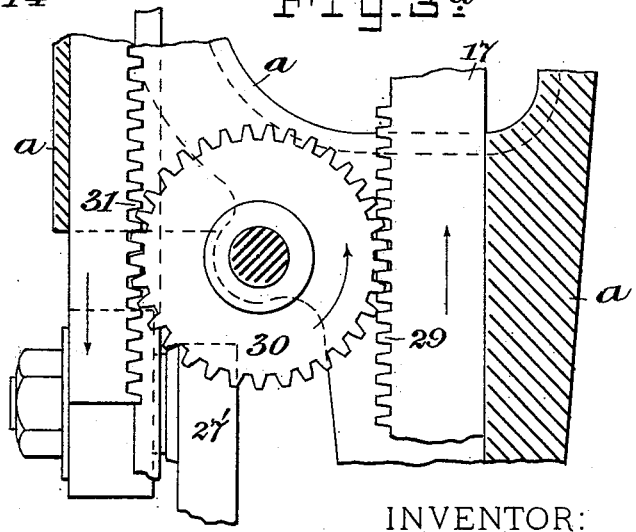
WITNESSES:
INVENTOR:
Andrew Campbell,
By Henry Connett
Attorney.

(No Model.) 9 Sheets—Sheet 6.
A. CAMPBELL.
BOTTLE WIRING MACHINE.
No. 404,028. Patented May 28, 1889.
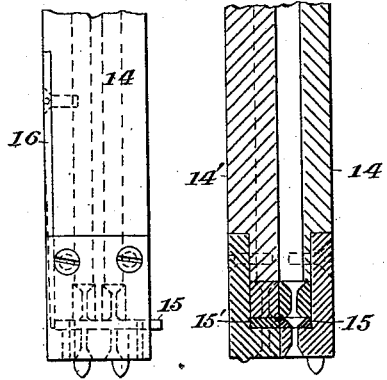
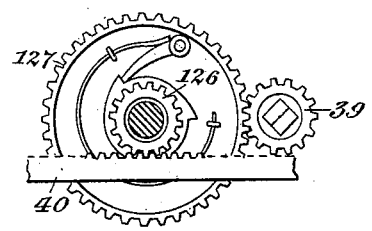
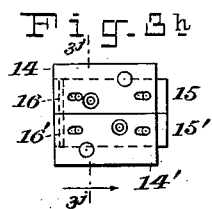
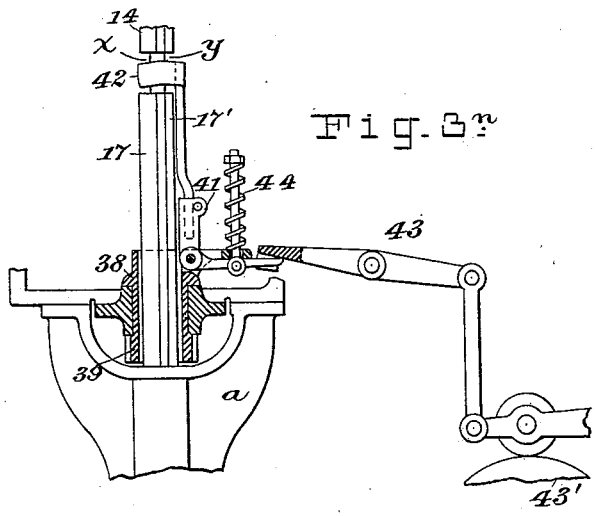
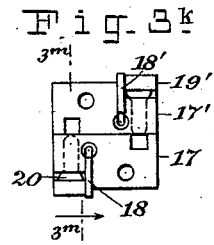
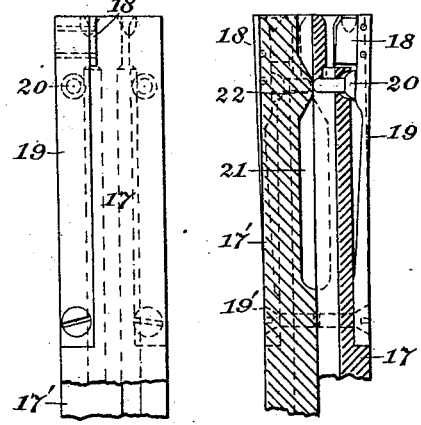
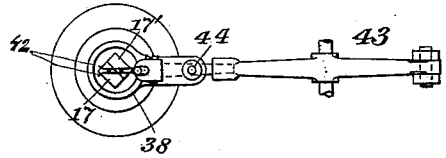
WITNESSES:
E. B. Bolton
J. B. Caplinge
INVENTOR:
Andrew Campbell,
By Henry Connett
Attorney.

(No Model.) 9 Sheets—Sheet 7.
A. CAMPBELL.
BOTTLE WIRING MACHINE.
No. 404,028. Patented May 28, 1889.
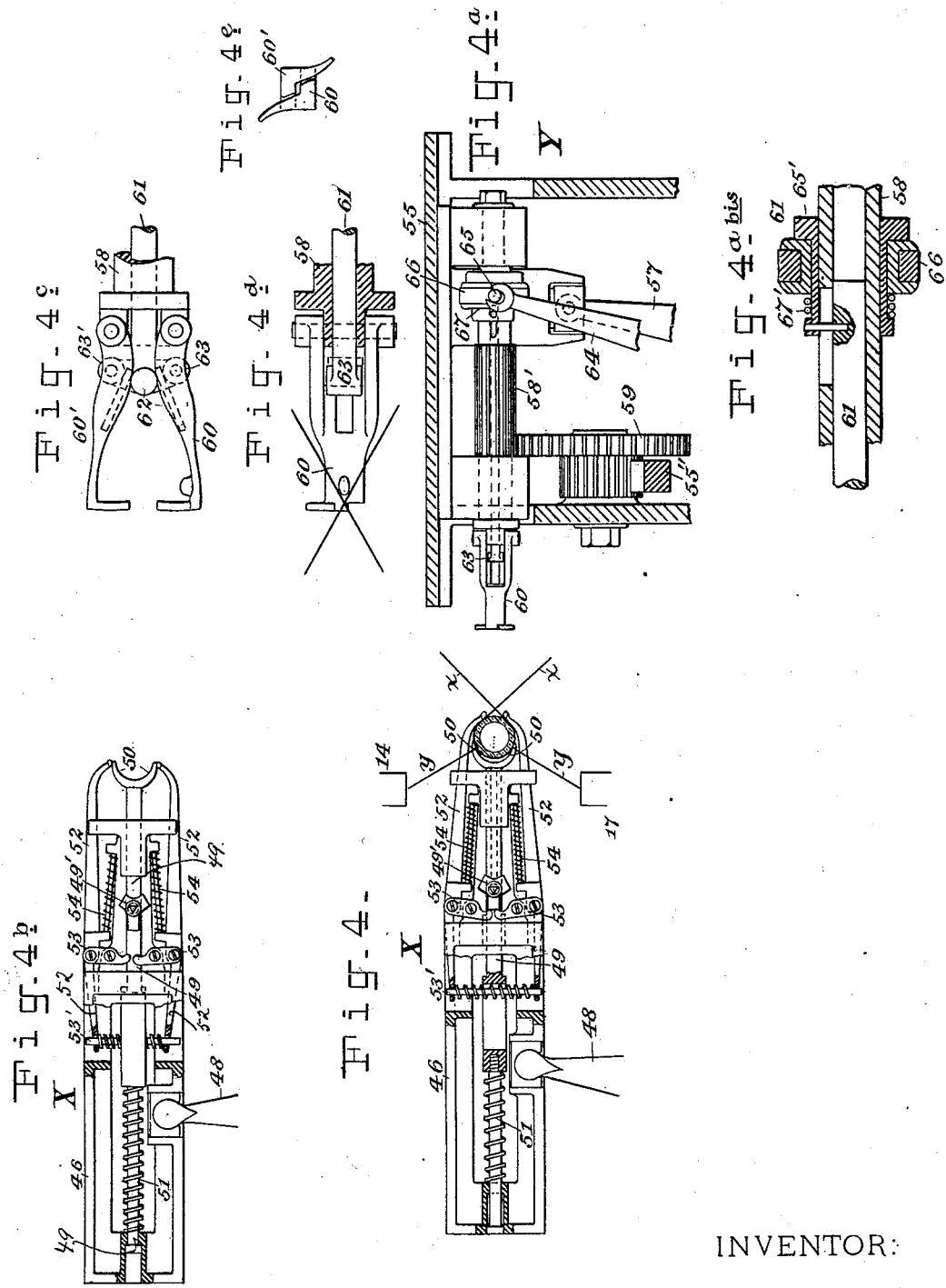
WITNESSES:
INVENTOR:
Andrew Campbell
By Henry Connett
Attorney.

(No Model.) 9 Sheets—Sheet 8.
A. CAMPBELL.
BOTTLE WIRING MACHINE.
No. 404,028. Patented May 28, 1889.
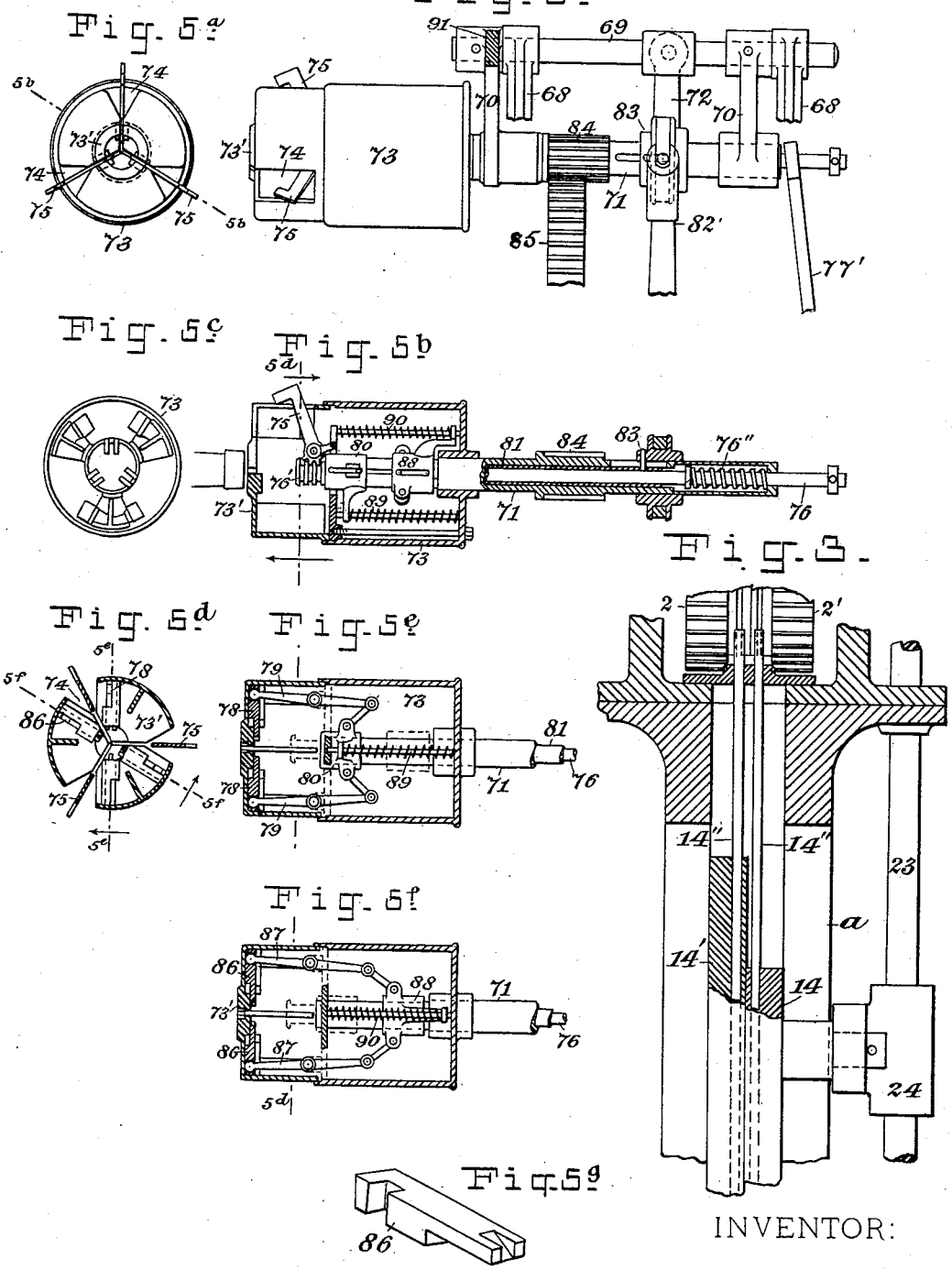
WITNESSES:
E. B. Bolton
J. B. Caplinge
INVENTOR:
Andrew Campbell
By Henry Connett
Attorney.

(No Model.)
A. CAMPBELL.
BOTTLE WIRING MACHINE.
No. 404,028. Patented May 28, 1889.
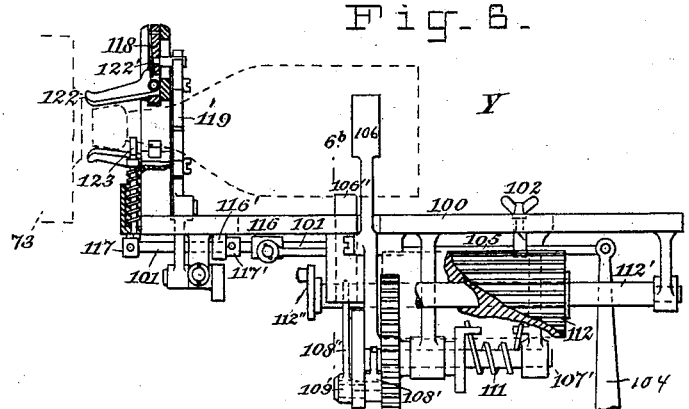
Fig. 6.
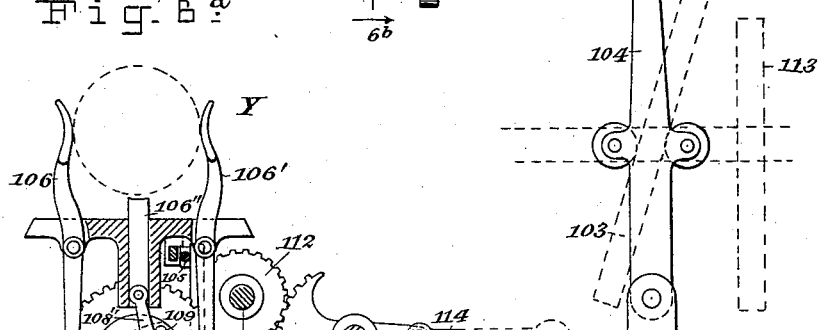
Fig. 6ᵃ.
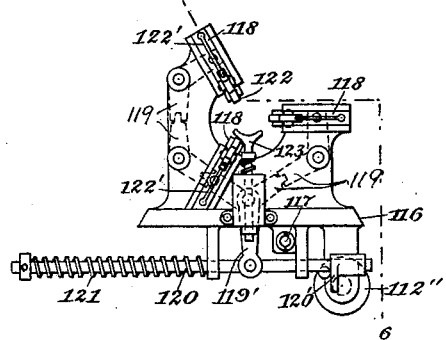
Fig. 6ᵇ.
WITNESSES:
INVENTOR:
Andrew Campbell
By Henry Connett
Attorney.

UNITED STATES PATENT OFFICE.

ANDREW CAMPBELL, OF BROOKLYN, ASSIGNOR, BY MESNE ASSIGNMENTS, TO THE N. B. ABBOTT MACHINE COMPANY, OF NEW YORK, N. Y.

BOTTLE-WIRING MACHINE.

SPECIFICATION forming part of Letters Patent No. 404,028, dated May 28, 1889.

Application filed October 1, 1888. Serial No. 286,905. (No model.)

*To all whom it may concern:*

Be it known that I, ANDREW CAMPBELL, a citizen of the United States, and a resident of Brooklyn, Kings county, New York, have invented certain Improvements in Bottle-Wiring Machines, of which the following is a specification.

My invention relates to a machine for applying the cork-retaining wires to bottles, and the object I seek to attain is the application of a triple-strand wire-retainer about the neck of the bottle, back of the fillet, and over the cork, and the application to the wires of the necessary strand connecting and fastening twists, all automatically and by a series of successive operations.

The wire-retainer applied by this machine comprises a circular band which tightly embraces the neck of the bottle back of the fillet and three strands that spring from said band at intervals of about one hundred and twenty degrees, pass up over the fillet and cork, and meet at the center of the cork, where they are twisted together to effect the fastening, and then bent down flat upon the top of the cork. This wire-retainer is formed of two pieces of wire, preferably of different lengths, in order to economize the material, and these two wires are twisted together at two points to unite them, the two uniting-twists being separated a distance about equal to one-third of the circumference of the bottle-neck. The branches of the shorter wire are bent from these twists up over the cork, and the branches of the longer wire are passed around the bottle-neck on opposite sides, then twisted together to tightly close the band, and then bent up over the cork. All the strands of wire are then brought together on top of the cork, twisted together, cut off to a uniform length, and finally bent down and embedded in the cork. This machine has a holder or support to receive and clamp the bottle to be wired, and when clamped by the holder it is arranged by preference to lie in a horizontal position. It has also two similar wire feeders and guides, which feeders take two wires from two reels or swifts and feed them down through guides. The wires are fed down unequally, in order that one of the pieces cut off from the reel may be longer than the other. They will usually be proportioned in length about as five is to seven, or thereabout. The upper and lower-wire-guides have a longitudinal vertical movement; but at first they stand aligned with their ends meeting at the level of the bottle-neck and at one side of the same. When the wires have been fed down in them to the proper distance, the wire-guides move apart a little—say from one to one and one-fourth inch—and the primary twister, arranged at the side of the bottle-neck, twists the two wires together. The guides now move farther apart, so as to expose enough of the wires to form a fastening for the bottle. A horizontally-moving band-placer now passes the branches of the longer piece of wire about the neck of the bottle and crosses them, and a second twister approaches from the opposite side and twists the two branches together, thus uniting the ends of the band and closing it tightly about the neck of the bottle. The wire band now has three branches or strands projecting out radially and equally spaced. A device which I call the "crown-twister," and which is axially aligned with the bottle, now advances to a predetermined position, and, striking the end of the cork in the bottle, pushes the latter back longitudinally in its holder, and simultaneously with this movement three forked pushers embracing the neck of the bottle move out and bend the three strands of the wire up over the fillet and into guideways in the crown-twister. Three gathering-fingers carried by the crown-twister now bend in the three strands over the top of the cork and bunch them at the center, and suitable twisting-jaws, also carried by the crown-twister, grip the bunched wires. The crown-twister now rotates axially, thus twisting all the strands tightly together, forming the final twist, and a cutter cuts the twist to a uniform or suitable length. The wiring is now completed in substance; but as soon as the final or crown twist is effected and the wires are cut off the crown-twister is moved laterally, whereby the twist is bent down and embedded in the soft substance of the cork.

Having thus briefly set forth the general purpose, construction, and mode of operation of my machine, I will now describe it more particularly with reference to the accompanying drawings.

The first four figures of the drawings show the wires and the mode of wiring. Figure 0 represents the two bits or pieces of wire both before and after they have been united by the primary twists. Fig. $0^a$ is a perspective view of the stoppered end of the bottle, showing the wiring over the cork $z$. Fig. $0^b$ is an end view of the corked and wired bottle, and Fig. $0^c$ represents the wire fastening as it would appear if removed from the bottle. Fig. 1 is a somewhat diagrammatic plan view of the wiring-machine as a whole, the view being designed mainly to indicate the positions of the several shafts, operating-cams, &c. Fig. 2 is a sectional front elevation of the machine as seen from arrow 2 in Fig. 1. Figs. $2^a$ and $2^b$ are sectional elevations taken substantially in the same plane, indicated by line $2^a\ 2^b$ in Fig. 1, the arrows $2^a$ and $2^b$ in said figure indicating, respectively, the directions from which the views are taken. Figs. 1, 2, $2^a$, and $2^b$ are on the same scale, and may be considered as about one-ninth of full size, although the machines may vary in size. Figs. 3 to $3^o$ are detached and more or less fragmentary views illustrating the construction of the wire feeding, cutting, and primary twisting devices, (indicated in general by W.) Fig. 3 on Sheet 8 is a sectional view of the upper guides, showing how the wires are led into the same through tubes. Fig. $3^a$ on Sheet 5 is a sectional view of the lower guide, showing the rack-and-pinion device whereby said guides are moved. Fig. $3^b$ is a sectional view of the wire-feeder, taken in a plane substantially in the axis of the driving-shaft and on a large scale. Fig. $3^c$ is a face view of the ratchet device seen in section in Fig. $3^b$. Fig. $3^d$ is a much enlarged sectional view of a part of the wire-feeding wheels, showing how they grip the wires at their peripheries. Fig. $3^e$ is a much-enlarged sectional view of the differential device connected with the wire-guides. Fig. $3^f$ is a plan view of the primary twister on a large scale. Fig. $3^g$ is a side view, on a large scale, of the wires at the twisting-point, illustrating the formation of the primary twists. Fig. $3^h$ is an end view, Fig. $3^i$ a side view, and Fig. $3^j$ a sectional view, of the upper wire-guides, showing the wire-cutters. Fig. $3^k$ is an end view, Fig. $3^l$ is a side view, and Fig. $3^m$ is a sectional view, of the lower wire-guides, showing the clamps therein. Fig. $3^n$ is a sectional elevation of the primary twister and the mechanism connected therewith. Fig. $3^o$ is a view of the ratchet device connected with the operation of the primary twister. Figs. 4 to $4^d$ are detached views illustrating the band-placer (indicated by X as a whole) and the secondary twister, (indicated by Y as a whole.) Fig. 4 is a sectional side elevation showing the band-placer in operation. Fig. $4^a$ is a side view of the second twister in its proper position with respect to the band-placer shown in Fig. 4. Fig. $4^{a\ bis}$ is a detached sectional view on a larger scale than Fig. $4^a$, illustrating means for coupling the operating-lever to the slide-bar of the second twister. Fig. $4^b$ is a side view of the band-placer as it appears when retracted. Fig. $4^c$ is an elevation, Fig. $4^d$ a sectional plan, and Fig. $4^e$ an end view, of the jaws of the secondary twister. Figs. 5 to $5^g$ are detached views illustrating the construction of the crown-twister, (indicated as a whole by Z.) Fig. 5 is a side elevation of the crown-twister retracted. Fig. $5^a$ is a view of its front end or face-plate. Fig. $5^b$ is a sectional elevation of the twister, taken in the plane of one of the three gathering-slots therein. Fig. $5^c$ is a view showing the lugs inside the casing in which the gatherers are mounted. Fig. $5^d$ is a transverse section on line $5^d$ in the several longitudinal sectional views. Fig. $5^e$ is a sectional view showing the twisting-jaws in the casing, and Fig. $5^f$ is a similar view showing the cutters. Fig. $5^g$ is a view of one of the cutters detached and on a large scale. Figs. 6 to $6^b$ are detail views illustrating the holders or supports for the bottle and the pushers, (indicated as a whole by V.) Fig. 6 is a sectional side elevation of the mechanism, showing the parts in their most advanced position. Fig. $6^a$ is a sectional elevation of the clamp for the body of the bottle. Fig. $6^b$ is a front elevation of the clamp for the neck of the bottle.

$a$ represents, in general, the frame of the machine, which will be of cast-iron by preference.

In Fig. 1, $a'$ represents a recess in the bed of the frame, where the bottle support or carriage is situated, and $a''$ represents a recess or well in the center of the bed, where the wiring is performed.

$b$ represents the main driving-shaft, $c$ the driving-pulleys, and $d$ the fly-wheel.

$e$ is a transversely-arranged cam-shaft mounted in the frame $a$, under the bed of same. This shaft is driven from shaft $b$ by gears $f$. This transverse shaft $e$ drives a cam-shaft, $g$, through miter-gears $h$, and a cam-shaft, $i$, at the opposite side of the frame through miter-gears $j$. On these three shafts $e$, $g$, and $i$ are fixed the various cams that actuate the several mechanisms that constitute the machine. These cams will be referred to in their proper order.

I have designated the several mechanisms, each as a whole, by a capital letter for convenience of reference.

V designates the mechanism for clamping and supporting the bottle A while it is being wired.

W designates the wire-feeding mechanism and guides and the device connected therewith for effecting the primary twists in the wires.

X designates the band-placer, which applies the wires supplied by the feeder to the neck of the bottle.

Y designates the second twister, which closes and completes the band, and Z designates the crown-twister, which gathers and bunches the wires at the center of the cork, twists them, cuts them off, and flattens them down.

Before proceeding to minutely describe the machine, I will say that the attendant places the bottle A to be wired in a support or holder, with its stoppered end directed toward the center of the machine-bed. The body of the bottle is held in a clamp and the neck in another and independent clamp. These will be hereinafter described. The wire band of the fastening encircles the neck of the bottle just below or back of the fillet thereon, and in placing the bottle in its holder or support the attendant is guided by this point on the bottle, which he places at a suitable guide on the machine.

The different mechanisms and the operations they perform will be described in their order of succession.

I will first describe the wire-feeder and primary twister, with especial reference to Figs. 1, 2, and 3 to 3°, premising that each wire $x$ and $y$ is fed by a separate but substantially like device, the two being necessitated by the requirement that one wire, $x$, shall be longer than the other, $y$. The wires are fed from reels or swifts (seen at $k$ in Fig. 2) by feed-wheels which grip the wire between their peripheries. Each wire is fed by two pairs of wheels, which grip it at different points, one wheel of each pair being driven from a toothed rack, and this wheel driving its mate through the medium of intermeshing teeth on their respective peripheries.

1 and 2 are the upper and lower driven feed-wheels for the wire $y$, and $1^a$ and $2^a$ are their mates, held up to their respective wheels 1 and 2 by a spring, 3. Fig. $3^d$ is an enlarged fragmentary sectional view showing how the wheels grip on the wires, a tongue on one wheel entering a groove in its mate. The wheels 1 and 2 are positively driven, as illustrated in Figs. $3^b$ and $3^c$. On a cross-shaft, 4, is fixed a toothed wheel, 5, with which gears a vertically-sliding rack, 6, secured to a rack-bar, 7. On the opposite end of the shaft 4 is fixed a box-wheel, 8, in which is hung a spring pawl or pawls, 9, which engage a ratchet-wheel, 10, fixed in a sleeve, 11, on the shaft 4. Secured on this sleeve 11 is a toothed wheel, 12, which gears with two toothed wheels, 13 and $13^a$, forming, respectively, parts of the feed-wheels 1 and 2. Downward movement of the rack 6 feeds the wire $y$ downward; but the upward movement of the rack does not affect the wheels 1 and 2 by reason of the pawls 9 riding over the teeth of ratchet-wheel 10. This ratcheting of the sleeve 11 to the shaft 4 is a well-known device and will need no further description. The other longer wire, $x$, is fed down alongside of wire $y$ by a like or twin device comprising upper and lower driven feed-wheels, $1'$ and $2'$, their mates $1^{a\prime}$ and $2^{a\prime}$ held up by a spring, $3'$, a toothed wheel, $12'$, on the sleeve 11 gearing with toothed wheels $13'$ and $13^{a\prime}$ on the wheels $1'$ and $2'$, respectively. The only difference between these two wire-feeders is this: The proportions between the wheels 12, 13, and $13^a$ is such as to feed the wire $y$ slower than it will be fed by wheels $12'$, $13'$, and $13^{a\prime}$. This proportion in the present machine is about as five is to seven; but it may be varied. The wires $x$ and $y$, when fed down, pass longitudinally through two slender fixed guide-tubes, $14''$, (which keep them straight,) into two vertically-sliding upper guides, 14 and $14'$, one wire through each guide. These guides are in the nature of bars, and they play in suitable slide-bearings in the machine-frame $a$. These guides are actuated by a cam, as will be set forth hereinafter. The lower ends of the upper guides, 14 $14'$, stand, when at their lowest points, on a level with axis of the bottle, A, which is to be wired, and in the end of each guide is mounted a wire-cutter. Figs. $3^h$, $3^i$, and $3^j$ represent these wire-cutters, (which are alike,) and also the general construction of the ends of the guides in a large scale. In the end of guide 14 is mounted a cutter-slide, 15, of steel, in which is a hole for the passage of wire $y$, aligned with the passage for the wire in the guide. This slide is held in its normal position by a spring, 16, on the guide. The opposite end of the slide projects laterally from the bar, and when pressure is applied to this projecting end the spring 16 yields, the slide moves longitudinally, and the wire is sheared off. The guide $14'$ has a like cutter to sever the wire $x$. This comprises a slide, $15'$, and its spring $16'$.

Aligned with the upper guides, 14 $14'$, are lower guides, 17 $17'$, also arranged to be moved up and down longitudinally. The upper ends of these lower guides, 17 $17'$, register with and stand in contact, respectively, with the ends of the guides 14 $14'$ when the former are at their greatest elevation and the latter at their lowest point. When the wires $x$ and $y$ are fed from the upper into the lower guides, the middle points of the pieces of wire to be cut off will stand at the meeting-points of the two sets of guides, and this point will be, as stated, at the level of the axis of the bottle A. These lower guides, 17 $17'$, are provided with like brakes to bind on the respective wires under certain conditions, and these brakes are illustrated in Figs. $3^k$, $3^l$, and $3^m$, which represent on a large scale the construction of the ends of the guides.

At the inlet for wire $y$ into guide 17 is placed a brake-jaw, 18. This jaw is adapted to bear on the wire, and is attached to the free end of a strong spring, 19, secured to guide 17. This spring tends to keep the brake-jaw constantly pressed on the wire; but under the spring 19 is placed a loose pin, 20, the opposite end of which stands in a longitudinal groove, 21, in the adjacent face of the other guide, $17'$; but in this groove is a slight elevation, 22, which, when the ends of the guides 17 17' are even or flush, stands under said pin 20, and acts as a cam to press back the spring 19 and relieve the brake, so that the wire may move freely through the guides. To set the brake on the wire, it is only necessary to move one guide longitudinally with respect to the other, when the pin 20 will pass off the elevation 22 and allow the brake-spring to act and set the brake. The other guide, 17', is provided with precisely the same kind of a brake; but it will not be necessary to describe both.

Before separately describing the mechanism any further I will describe the operation of feeding, twisting, and cutting off the pieces of wire $x$ $y$.

Suppose the ends of the upper and lower wire-guides to be brought into contact. The rack-bar 7 is drawn down by a cam, 7', and the wires are fed down by their feed-wheels until one-half of the lengths to be cut off is projected down into the lower guides, 17 17'. There will now be, say, two and one-half inches of the wire $y$ and three and one-half inches of the wire $x$ in the lower guides. The feed of the wires is now arrested and the upper and lower guides move apart, the former upward and the latter downward, the wires standing stationary. When the guides shall have separated a predetermined distance—say one and one-eighth inch—the members of the pairs of guides, which have moved thus far side by side at the same speed, will begin to move at different rates of speed, the upper guide, 14, and lower guide, 17, for the wire $y$ moving slower than the guides 14' and 17' for the wire $x$.

I will now describe the devices by which the wires are fed, the guides moved, and the differential movements of the two elements of each pair of guides are effected, premising that the upper guides, 14 14', have precisely the same devices for this purpose as the lower guides, 17 17', and that the movement imparted to one member of each pair is communicated by that member to the other, either decreased or diminished, as the case may be. In the present case it will be increased.

I have herein represented the guides for the shorter wire, $y$, as the drivers; but this is not material.

23 is a slide-rod mounted in the machine-frame $a$ and standing parallel with the guides for the wire. This rod is connected by a bracket, 24, with the upper guide, 14, and by a bracket, 25, with a connecting-rod, 26. The other end of this rod 26 is connected by an adjustable slotted coupling with a lever, 27, fulcrumed in the machine-frame, the other end of said arm carrying a roller that rests on the wire-guide-operating cam 28.

The rack-bar 7, which effects the feed of the wires, stands parallel with the guides, and is actuated by cam 7' through a connecting-rod, 26', and a lever, 27', in the same manner that the wire-guides are operated. The lower guide, 17, has on it a rack, 29, (see Fig. 3ª,) which gears with a toothed wheel, 30, mounted in the machine-frame, and this wheel 30 gears on its opposite side with a rack, 31, which plays endwise in guides in the machine-frame, and is connected at its upper end with the yoke 25. Thus the lower guide, 17, is caused to move at the same rate of speed as the upper guide, 14, but in an opposite direction. As only one of each pair of guides is moved by the cam, the following-described device is employed to impart a differential movement:

On the upper guides is mounted a pinion-frame, 32, (see Figs. 2 and 3ᵉ,) in which are rotatively mounted two connected pinions, 33 and 33', which have different diameters. The lesser pinion 33 meshes with a rack, 34, on the guide 14, and the larger pinion 33' meshes with a rack, 34', on the guide 14'. Thus the movement of the guide 14 will impart to guide 14' a movement in the same direction; but the extent of movement of guide 14' will be greater than that of guide 14. To enable guide 14 to actuate guide 14' in this manner, however, it will be necessary to prevent the frame 32 and its pinions from moving with the wire-guides, and this I effect by constructing the frame $a$ of the machine to embrace and house said frame 32, as seen in Figs. 2 and 3ᵉ. I leave room, however, for a little play of said frame 32 in the housing inclosing it, as seen at 35 in Fig. 2, and provide the pinions 33 33' with some suitable frictional device—as, for example, a soft washer, 36, (seen in Fig. 3ᵉ)—to enable the frame 32 to move with the guides 14 14', as far as the space at 35 will permit. The reason for this I will now explain, reverting to the description of the operation of the feed, where, as has been stated, the upper and lower guides had moved apart about one and one-eighth inch. The lower guides, 17 17', are provided with a device precisely like that just described for effecting a differential movement of the two guides.

The play of the pinion-frames 32, permitted by the spaces at 35, causes the guides of the pairs to move together at the same speed until the further movements of the pinion-frames are arrested. After that the differential movement begins. When the upper and lower guides shall have separated to the extent of about one and one-eighth inch, as stated, and their movement has been arrested, the primary uniting-twists are effected between their ends, and when this is done it is desirable that the guides of each pair shall stand with their ends even, in order to afford a better abutment or shoulder when the twist is made, and also in order that the same length of each wire may be exposed. The two primary uniting-twists are seen at 37 37 in Fig. 3ᶠ, wherein the guides are shown as separated to the proper extent, and the twists completed by the primary twister.

It will be understood that when the upper and lower guides move apart the wires $x$ and $y$ will be exposed, that they will stand parallel and about one-fourth of an inch apart, and that they will be clamped above by the feed-wheels and be free or loose in the brakes in the lower guides.

I will now describe the primary twister and its operation, with especial reference to Figs. 2, 3$^f$, and 3$^n$.

Mounted rotatively in the machine-frame in such a manner as to embrace the lower guides, 17 17', concentrically is a sleeve-like shaft, 38, on which is formed a pinion, 39, which is driven by a rack, 40, actuated at the proper time by a cam, 40', in such a manner as to impart two revolutions (or more, if desired) to the shaft 38. This shaft carries at its upper end an elbow-lever, 41, on the upright arm of which is secured a pair of twisting-blades, 42. These blades stand opposite the point where the upper and lower guides meet, and are normally drawn back by the downward pressure on the horizontal arm of lever 41 of one end of a lever, 43, pivoted on the machine-frame and actuated by a cam, 43'. At the moment the upper and lower guides move apart, as above described, the cam which actuates the lever 43 lifts said lever off from the arm of the elbow-lever 41, and a spring, 44, acts on the latter and drives the blades 42 forward over the wires $x$ and $y$, so as to embrace them. At this moment the driving-rack 40 imparts two revolutions to the shaft 38, and the blades 42 are thus carried around concentrically with the wires and impart the primary uniting-twists thereto, as seen in Fig. 3$^g$. The lever 43 now again descends, and by pressing on the short arm of the elbow-lever 41 retracts the twisting-blades and frees them from the wires. The cam 28 now sets the upper and lower wire-guides, 14 14' 17 17', in motion again, and they move apart until the proper lengths of the wires $x$ and $y$ are exposed—say seven inches of wire $x$ and five inches of wire $y$—when said guides are again arrested for a moment. During this movement the brake-jaws in the lower guides, which are now set, slide over the wires and keep them taut, and enough of the ends of these wires will remain in the lower guides for the brake-jaws to clamp upon. As the upper guides, 14 14', move upward, the projecting ends of the cutter-slides 15 15' pass, respectively, under pendent arms of elbow-levers 45 and 45', the other arms of which are coupled to rods 45'', whereby cams 15'' are made to actuate said levers at the proper times and through them the cutter-slides wherewith the wires $x$ and $y$ are severed. Before the wires are cut off by the device last described the device X, which applies the wires to the neck of the bottle, and which I call the "band-placer," comes into operation. This device is illustrated in Figs. 4 and 4$^a$.

The axes of the wires are at right angles to the axis of the bottle, A, being wired, and they stand when taut at one side of the bottle-neck, distant, preferably, about two inches from the axis of the bottle—that is to say, at such a distance that when pushed laterally over against the bottle-neck the wires will have an inclination of about sixty degrees.

The band-placer is seen at the left in Fig. 4 and is indicated as a whole by the letter X. Its function is to push the united wires $x$ and $y$ over to and about the neck of the bottle. It comprises a carriage or frame, 46, mounted to slide in horizontal guides in the machine-frame, and it is actuated by a cam, 47, and lever 48. In this frame 46 is mounted a slide-rod, 49, bearing on its end two like and connected forked fingers, 50 50. It is provided with a spring, 51. In the frame 46 are also mounted two like forked fingers, 52 52. These latter fingers are in the nature of levers. They are pivoted, respectively, in the outer ends of two short levers, 53 53, which latter have their fulcrums on the carriage 46 and their inner ends arranged in the path of an adjustable shoulder, 49', on the rod 49. Between the tails of the lever-fingers 52 is arranged an expanding-spring, 53', which tends to move the operating ends of said fingers inward or toward each other.

Fig. 4 represents the band-placer X in its advanced position, and Fig. 4$^a$ represents it drawn back or retracted. It operates as follows: At the proper moment the band-placer advances toward the wires $x$ and $y$ and the forked ends of the protruded fingers 50 engage the branches of the wire $x$ just beyond or exterior to the primary uniting-twists 37. The further movement of the band-placer causes the fingers 50 to apply the wires to the side of the bottle-neck, when the further forward movement of the rod 49 and said fingers 50 will be arrested; but compression of the spring 51 will permit the other parts to move on. The forked ends of fingers 52 will also engage the branches of wire $x$, and at this moment said wire $x$ will be severed at the end of the upper guide, 14'. As the fingers 52 advance they push the branches of wire $x$, which are now free, around the opposite sides of the bottle-neck to form the band, the spring 53' keeping said fingers pressed up to the bottle. When the forked ends of the fingers shall have reached and passed the axial line of the bottle-neck, the shoulder or collar 49' on the slide-rod 49 will oppose itself to the further advance of the inner ends of the two short levers 53; but the fulcrums of said levers will advance with the frame or carriage 46, and this will cause their outer ends to throw forward the lever-fingers 52 in such a manner as to cause their forked extremities to close about the bottle-neck and cross the branches of wire $x$ at the back of said neck, as seen in Fig. 4. This forward movement of the fingers 52 compresses two retracting-springs, 54 54, as clearly illustrated in the drawings. The wire $y$ will now be severed by the cutter in the end of guide 14, and the band-placer X will stand in its advanced position for a moment until the secondary twister Y has time to advance and seize the crossed branches of wire $x$.

I may say here that the two sets of fingers 50 and 52 stand in the same vertical plane with wire $x$, and both sets engage this wire with their forked ends. The wire $y$ will be carried to the bottle-neck by wire $x$. In order to insure the branches of wire $x$ crossing properly without collision, the forks in the two fingers 52 are given slight and opposite bevels sufficient to direct the two branches of the wire into slightly different planes.

The secondary twister, which seizes and twists together the two branches of wire, $x$, is illustrated in Fig. $4^a$. It comprises a carriage or frame, 55, mounted to slide on the frame of the machine and adapted to be actuated by a cam, 56, and lever 57. In the frame 55 is rotatively mounted a tubular shaft, 58, on which is fixed a long pinion, 58', which gears with a toothed wheel, 59, mounted in the main frame. Rotation of wheel 59 is effected by a cam, 59', through a lever, 55', and a rack, 55''. The long pinion enables the wheel 59 to keep in gear with the pinion in all positions of the frame 55. On the end of the shaft 58 that is directed toward the bottle are mounted two twisting-jaws, 60 and 60', adapted to be opened and closed. These are seen detached and on a large scale in Figs. $4^c$, $4^d$, and $4^e$, which also illustrate how they seize the crossed branches of wire $x$. Each jaw has a long tooth or prong, and these are so arranged that when the jaws come together the wires will be embraced on all sides at their crossing-point and firmly held, as shown. On the jaw 60, or on either jaw, is a tooth which enters between the branches of the wires beyond the crossing-point. This tooth keeps the wires separated and properly effects the twist. When the jaws of the twister shall have advanced to the proper position to seize the wires, the jaws are closed on the latter by a device illustrated in Fig. $4^e$, and which I will describe.

The jaws 60 and 60' are hinged to a head on the shaft 58, and in the hollow of the said shaft is arranged a slide-rod, 61, on the extremity of which is mounted a device for opening and closing the jaws 60 60' by the endwise movement of rod 61. The opener or spreader consists of a bar, 62, which acts as a wedge between the inclined inner faces of the jaws, and the closing device consists of two like rollers or pairs of rollers or blocks, 63 63', mounted in the ends, respectively, of two arms or branches from the rod 61, which arms pass through and play in slots in the respective jaws 60 and 60'. The rollers 63 63' roll on the inclined outer faces of the jaws. The operating slide-rod 61 is moved longitudinally by a cam, 64', and forked lever 64, the branches of which engage trunnions 65 on a ring, 66, said ring embracing a circumferentially-grooved slide ring or sleeve, 67, on the shaft 58. This sleeve is pinned to the slide-rod 61, and the pin plays in a slot in the tubular shaft 58. This construction is the same as that of the well-known "pencil-slide." This secondary twister Y advances and the jaws thereof are made to close on the branches of wire $x$, as described, by a movement of rod 61. The shaft 58 is now set to rotating by the wheel 59, whereby the jaws of the twister are caused to twist the wires together; but after two revolutions have been made the jaws slacken their grip a little and the cam 56 begins to draw back the carriage 55. The effect of this arrangement is that two tight band-closing twists are first made and the wires are then more loosely twisted together. The movement of the carriage 55 is sufficient to cause the jaws of the twister to pass off from the wire and leave it free. As soon as this secondary twist is formed and the three strands of the fastening-wire are left standing out radially from the band about the neck of the bottle, the device that pushes these up over the fillet on the bottle comes into action. This device consists of three notched or forked arms connected with the neck-clamp. Before proceeding to describe this operation I will describe more minutely the bottle-supports and the operating mechanism connected therewith, with especial reference to Figs. 6, $6^a$, and $6^b$.

The bottle A is supported at two points—namely, at the body and at the neck. In the recess $a'$ in the bed of the machine-frame $a$ is mounted to slide in guides a carriage, 100, which is adjustably connected to a slide-rod, 101, by a suitable screw-clamp, 102, whereby said carriage may be set at different points along said rod. The slide-rod 101 plays in bearings in the machine-frame $a$, and an irregular reciprocating endwise movement is imparted to it from a barrel-cam, 103, through a vibrating lever, 104, which is coupled at its upper end to said rod 101 by a connecting-rod, 105. Mounted pivotally on the carriage 100 are two lateral jaws, 106 106', which embrace the bottle A at its sides and clamp it frictionally, and mounted also in said carriage is a supporting sliding jaw, 106''. The bottle rests on the upper end of this latter jaw.

The mechanism for actuating these three clamping-jaws comprises a gear-wheel, 107, rotatively mounted on the carriage 100, to which wheel the lower ends or tails of the jaws 106 106' are coupled, respectively, by links 108 and 108'. These links extend across the face of wheel 107, and are connected thereto by wrist-pins 109. On the outer ends of the pins 109 is fixed a disk, 110, which is, through these pins, rigidly connected with the wheel 107, and to a wrist-pin, 109', on this disk 110 is coupled the jaw 106'' through the medium of a link, 108''. The three jaws are simultaneously set on the bottle by partial rotation of the wheel 107. About the shaft 107' of this wheel is coiled a stout spring, 111, one end of which is secured to the shaft-bearing and the other to a collar fixed on shaft 107'. This spring sets the jaws strongly on the bottle. The shaft 107' is rotated in the opposite direction by a long pinion, 112, rotatively mounted in the machine-frame and in gear with the wheel 107. The pinion 112 is actuated by a cam 113 through the medium of an elbow-lever, 114, and a segment-rack, 115, which gears with the pinion.

The neck-clamp which supports the bottle is constructed as follows: 116 is a carriage similar to carriage 100 and mounted in a continuation of the same guides or keepers with the latter. It has a pendent lug, 116', through which plays the slide-rod 101. On this rod 101 are two collars, 117 117', one on each side of the lug 116'. Thus the rod is permitted to play a distance equal to that between said collars without moving the carriage 116; but a further movement in either direction causes both of the carriages 100 and 116 to move together. The bottle-neck is clamped by three like sliding jaws, 118, arranged to play in guides in a part of the carriage 116, and these jaws are actuated simultaneously by a series of knuckle-levers, 119. The lower one of these levers has a pendent arm, 119', which is coupled to a pin in a transversely-arranged slide-rod, 120, mounted in bearings in the carriage 116. A spring, 121, on the rod 120 sets the jaws 118 on the neck of the bottle. The jaws of the neck-clamp are opened, so as to release the bottle, by the same cam and intermediate mechanism that are employed to open the jaws that clasp the body of the bottle. On the end of the shaft 112' of the long pinion 112 is a crank, 112'', and when the carriage 116 is drawn back a pin, 120', in the rod 120 is by this movement placed in position to be caught by the wrist-pin of crank 112'' when shaft 112' rotates, and this serves to move rod 120 endwise, so as to compress spring 121 and open the jaws of the neck-clamp.

Before describing the movements of the carriages and clamps I will describe the pushers heretofore referred to, and which are borne by the jaws of the neck-clamp.

On each jaw 118 is pivotally mounted a pusher, 122, which projects toward the corked mouth of the bottle and is kept pressed up to the neck of the same by a spring, 122'. Each pusher has a fork and groove at its end, and each is arranged to stand in such a position with respect to the three radially-projecting strands of wire that when the pushers are moved up toward the mouth end of the bottle the forks in their ends will engage each its particular wire and carry it up over the fillet.

Fig. 6 shows the bottle holders or clamps and these pushers 122 in their most advanced position. When drawn back to their normal position, the clamps are open and the bottle is placed therein by the attendant. In placing the bottle in the holder the attendant is guided by a forked spring-supported guide, 123, mounted on the carriage 116, just in front of the neck-clamp. He sees that the bottle is so situated in the clamps that this guide stands just at the shoulder of the fillet, at the point where the wire band is to be placed. The cam 113 now passes and allows the springs 111 and 121 to set their respective clamps on the body and neck of the bottle, and cam 103 moves the carriage 100 forward or inward, carrying the bottles with it and pushing its neck through the neck-clamp, which does not grasp the bottle very tightly. This neck-clamp is merely designed to steady and center the bottle and not to grip it tightly. This movement continues until the collar 117' on rod 101 reaches the lug 116' on the carriage 116, which latter has not been moved. This movement of the bottle brings the shoulder of the fillet to the proper position for the band-placer X to properly place the wire band about the bottle-neck. The forked end of the pushers 122 will now stand a little way back of the point where the band is to encircle the neck. The carriages 100 and 116 now remain stationary until the band is applied, and while the second twister, Y, is operating the cam 103 again sets these carriages in motion, moving them inward together. During this movement of the bottle and carriages, however, a device which I call the "crown-twister," and which is designated as a whole by the letter Z, comes into action and moves in from the opposite direction. The axis of this crown-twister is aligned with that of the bottle, and its advancing face moves up to a fixed point regardless of the bottle—that is to say, if the outer end of the cork in the bottle projects from the bottle-carrier beyond a predetermined minimum distance (as it generally will) then the face of the crown-twister will strike the end of the cork and push the bottle back in the clamps. The carriages and clamps will, however, continue to advance. The forks in the ends of the pushers 122 will engage their respective wires and push them up over the fillet. When the pushers and the crown-twister cease to move toward each other, the advanced ends of the pushers will stand close to the face of the crown-twister, as seen in Fig. 6.

Before proceeding with the description of the crown-twister and its functions it will be advantageous to explain that bottles of the kind that require wiring are not uniform, those of like capacity varying considerably in their dimensions, and particularly in the distance from the shoulder of the fillet, where the wire band is to be placed, to the end of the work. To adapt the machine to this variability in the bottles, I so construct it that the two points where the work is to be done—namely, the making and applying of the wire band and the gathering and twisting of the wires on the top of the cork—shall be closer together than the distance from the band to the top of the cork in the smallest bottle wired. This necessitates in the case of the larger bottles that they shall be moved endwise in the clamps by the crown-twister. I will say here that in order to effect the crown-twist properly the crown-twister, after it has moved up to its most advanced position and pushed back the bottle, at once withdraws a little, so as to leave a space of, say, one-eighth of an inch between its face and the end of the cork.

The function of the crown-twister is to gather the three strands of the wire over the cork and bunch them, to twist them together, to cut off the twist to a uniform length, and, finally, to bend it over and flatten it down on the cork. It is illustrated in detail in Figs. 5 to 5ᵍ, and reference to these figures may be had in connection with the following detailed description.

In suitable bearings, 68, on the frame $a$ is mounted a bar, 69, which is capable of rotation and endwise movement in its bearings. Suspended from this bar by bearing-brackets 70 is a tubular shaft, 71. The shaft 71 is rotatively mounted in its brackets and bears on one end a casing or box, 73, which is preferably cylindrical and which contains the operative mechanism. This casing is fixed to the shaft and is provided with suitable lugs interiorly to form bearings for the moving parts.

The face-plate 73′ of the casing 73 (seen in Fig. 5ᵃ) has formed in it three equally-spaced radial slots, 74, which meet in the center of the plate and are flared at their outer ends. These slots are arranged to receive, respectively, the three strands of wire when the latter are bent up by the pushers so as to stand parallel with the axes of the bottle and the crown-twister. As the crown-twister moves up, its face-plate strikes and pushes back the bottle simultaneously with the bending up of the wires and their engagement with the slots 74. The wires now stand in their respective slots and are within the casing 73.

In suitable lugs on the inside of the casing 73 are pivoted three gatherers, 75, for the respective wires. These gatherers are situated so as to play in their respective slots 74, and their heads or free ends are adapted to gather in the wires over the cork and bunch them together at the center of same. The gatherers are actuated simultaneously by mechanism that will now be described.

In the tubular shaft 71 is mounted a slide-bar, 76, on the inner projecting end of which is a cylindrical rack, 76′, the teeth of which gear with segment-racks on the pivoted ends of all the gatherers 75. Movement of bar 76 in one direction throws the gatherers outward and movement in the opposite direction throws them inward. The slide-bar 76 projects out through the end of the tubular shaft 71, and it is actuated to effect the gathering by a cam, 77, and lever 77′. These gatherers are not designed to grip the wires tightly, but to close up the slots and embrace the gathered wires. When the wires have been bunched by the gatherers 75 at the center of the cork, they are seized by two twisting-jaws, 78 78, mounted to play radially in guides on the inner face of the face-plate 73′. These jaws are actuated simultaneously by two like levers, 79 79, fulcrumed in lugs on the casing 73. The outer ends of these levers are connected by links to a sleeve, 80, that slides on the tubular shaft 71, and this sleeve is connected by a pin to a tubular slide-bar, 81, arranged inside of the shaft 71 and embracing the slide-bar 76. The connecting-pin plays in a slot in the shaft 71. The tubular bar 81 is moved endwise to cause the jaws to clamp the wires by a cam, 82, and a forked lever, 82′, the forks on the lever being coupled to a ring on a pencil-slide, 83, on the shaft 71, connected by a pin with the bar 81, said pin playing in a slot in the shaft 71. This pencil-slide is in itself a well-known device, and will need no more minute description. When the jaws 78 have been made to firmly grip the wires, rotation is imparted to the shaft 71 and casing 73 through the medium of a long pinion, 84, on said shaft and a toothed wheel or sector, 85, gearing therewith. This wheel 85 derives its motion from cam 85′. The effect of this is to twist the wires together and draw them down tightly into the soft material of the cork. Two or three turns will suffice to effect the twist. The twist is now cut off by two cutters, 86 86, mounted to play radially, like the jaws 78, in guides on the inner face of the face-plate 73′. These cutters are actuated simultaneously by two like levers, 87 87, fulcrumed in lugs on the casing 73. The outer ends of these levers are connected by links with a sleeve, 88, that slides on the tubular shaft 71, and this sleeve is connected by a pin with the tubular slide-bar 81, the said pin playing in a slot in shaft 71. The cutters 86 are thus actuated in precisely the same manner as the jaws 78 and from the same slide-bar, 81; but the endwise movement of said bar that actuates the cutters is in the opposite direction from that which actuates the jaws. I will explain how this is effected. A spring, 89, acts on the sleeve 80 in a manner to retract the twisting-jaws 78, and a spring, 90, acts on the sleeve 88 in a manner to retract the cutters 86. The pins which connect the sleeves 80 and 88 with the tubular slide-bar 81 play in a slot in the main shaft 71, in order to allow said sleeves to move along said shaft; but said pins also play each in a slot in its sleeve. The object of this construction is to allow the slide-bar 81 to move outward, carrying the sleeve 80, until the jaws 78 are set on the wires without disturbing the sleeve 88. During this movement the pin slides in the slot in sleeve 88. When the slide-bar 81 begins its return movement inward, the spring 89 is allowed to drive sleeve 80 back and retract the jaws 78, and when said bar reaches the middle of its stroke the pin in sleeve 88 will have reached the end of the slot therein and the sleeve 80 will have been retracted. In the last half of its inward movement the bar 81 will move the sleeve 88 inward and cause the cutters to close on and sever the twist of wire. The bar 81 now moves out to its middle position, (seen in Fig. 5ᶠ,) thus permitting spring 90 to retract sleeve 88 and the cutters 86. The twist is now embraced by the gatherers only, which remain closed. The next and final operation is that which flattens down the twist on the cork, and this is effected by a lateral swinging movement of the crown-twister Z by the oscillation of the bar 69 in its bearings 68. This movement, which will not usually exceed half an inch in extent, is effected by an arm, 91, fixed to said bar 69 and coupled by a connecting-rod, 92, with a lever, 93, which bears a roller actuated by a cam, 94. The endwise movements of the casing 73 and its shaft 71 are effected by a cam, 92′, and an elbow-lever, 72. The gatherers are retracted by a spring, 76″, arranged in the end of shaft 71, beyond the end of slide-bar 81. The spring abuts at one end against a collar on the slide-bar 76 and at its other end against an internal shoulder on shaft 71. The swinging movement of the casing 73 is not sufficient to interfere with the engagement of the pinion 84 with its driver 85. Owing to lack of space for the rotation of the primary twister 42 when retracted, this twister does not rotate backward after having made the primary twists. To change the reciprocating motion imparted by the cam to intermittent rotary motion of the pinion 39, I employ the ratchet device illustrated in detail in Fig. 3⁰. This device I will now describe. A cam, 40′, on shaft $e$ acts through a suitable rod to impart a reciprocating movement to the horizontal rack 40, mounted to slide in guides in the main frame. This rack gears with a pinion, 126, mounted on the same stud or shaft with a toothed wheel, 127, and ratcheted with the latter. The wheel 127 gears with the pinion 39. For convenience in actuating the rack 40 from a cam I proportion the parts as follows: The wheel 127, in making two-thirds of a revolution, imparts two revolutions to the pinion 39. The pinion 126 may have the same diameter as the pinion 39. The ratchet on the pinion 126 has but three teeth, and a pawl on the wheel 127 engages these teeth. Three teeth will suffice if equally spaced. To hold the twister-blades 42 stationary after the twists have been completed and during the retraction of the rack 40, the lever 43 is provided with a keeper-notch at the end, which bears on and depresses the arm of elbow-lever 41, whereby when the lever 43 descends on the said arm and retracts the twister-blades the pinion 39 is held against rotation.

In order to keep the wires from "buckling" as they are fed down to the upper guides, I employ the device best illustrated in Fig. 3, in which the upper ends of these guides are shown on a large scale. To the frame $a$, I secure the two guide-tubes 14″ before mentioned. The upper ends of these tubes stand quite close to their respective wire-feeding wheels, and their lower ends extend down into the boxes in the upper ends of their respective guides 14 14′. In the movements of the guides up and down they play over the tubes 14″, but never entirely separate therefrom.

I have not deemed it necessary to give the forms and sizes of the various cams employed to impart motion to the several mechanisms, as this is a matter within the knowledge of any workman skilled in the art; nor have I shown all of the various springs employed to retract the parts after they have been compelled by the cams to do their work. As an example of the retracting-springs employed, 128 represents (see Fig. 2) the spring employed for retracting the wire-guides 14 14′, 17 17′ and its guide-rod, and 129 is the spring for retracting the rack-bar 7. The various cam-levers will be provided with suitable fulcrum-bearings on the main frame below the bed. The two levers 57 and 64, which act, respectively, to feed forward the secondary twister and to open and close the jaws of same, are actuated by separate cams 56 and 64′; but they are provided (see Fig. 2ᵇ) with a common retracting-spring, 56′, arranged between them and attached at its ends to each lever, respectively.

The machine is adapted for adjustment to suit bottles of different sizes. For example, the cam-lever 27 is connected by a curved slot with the rod or link 26, as seen in Fig. 2. This enables the movement of the wire-guides to be varied in extent from a fixed point. The stem carrying the twister-blades 42 is made readily detachable from the elbow-lever 41, in order that wider blades may be employed for larger bottles.

In the band-placer X the adjustable shoulder 49′ on the rod 49 has three faces, either of which may be turned, so as to strike the tails of the short levers 53. The object of this is to enable the fingers 52 to cross the branches of the wire $x$ at approximately the same point on bottles having necks of different sizes.

In describing the operations of the machine I have referred to one operation as succeeding another; but in practice the cams will be so set that one operation overlaps another, so that no time will be lost. For example, the wire-feeders and primary twister will be in operation feeding down and uniting two wires to form a band for the next bottle while the last-made band is being applied to the bottle in the machine.

I may say that the machine will be provided with an automatic device for stopping it at the close of each wiring operation, and the attendant will start it again after he shall have removed the wired bottle and replaced it by a new one. This device, however, forms no part of the machine proper.

Below Fig. 4ᵃ will be seen a supplementary sectional view illustrating the preferred mode of coupling the lever 64 to the slide-bar 61, that actuates the jaws of the secondary twister Y. To prevent the jaws of said twister from closing too forcibly on the wires, whereby one or both might be severed, I cushion the slide 67 on a spring, 67'', arranged between said slide and a flange on a slide, 65', pinned to the rod 61. This spring 67'' will be strong enough to hold the jaws on the wires while the twisting is being effected, but it will yield before the wires are clamped forcibly enough to sustain injury. The machine might be adjusted so as to operate without this cushion; but the latter is a judicious precautionary device.

I may say here that the jaws of the secondary twister will be so operated that after the first two twists are made they will slightly relax their grip while the final slack twist is being effected.

In Fig. 5° I have shown the form of cutter for the wire twist in the crown-twister. In order to prevent the blunting and dulling of the two cutters 86, which come together edge to edge in cutting the wire, I form each cutter of a bar of steel, and form in this bar a cutting-edge by beveling down a part only of its end, as shown in Fig. 5°. Thus, when the cutters strike together, the edges are protected against injury, the one by the other, by the abutting of the square or blunt ends of the bars.

The ends of the guides 14 14 and 17 17 may be provided, respectively, with conical studs and conical recesses to receive said studs, whereby when the ends of the guides come together the wire-passages therein will be brought into exact coincidence.

Having thus described my invention, I claim—

1. In a bottle-wiring machine, the combination, with a double set of wire-feeding wheels, of two sets of reciprocating wire-guides and a primary twister which unites the two wires between the upper and lower pairs of guides, substantially as set forth.

2. In a bottle-wiring machine, the combination, with two sets of wire-feeders for the wires driven at different rates of speed, of two sets of reciprocating wire-guides which move at different rates of speed, and a primary twister which unites the wires between the upper and lower pairs of guides, substantially as set forth.

3. In a bottle-wiring machine, the combination, with feeders which feed the two wires, of upper and lower reciprocating guides through which the wires pass longitudinally, said guides being axially aligned, wire-cutters for severing the wires at the upper guides, and a twister which unites the wires exposed by the separation of the upper and lower guides, substantially as set forth.

4. In a bottle-wiring machine, the combination, with the wire-feeders, of the reciprocating upper wire-guides and the guide-tubes which lead the wires from the feeders into the guides.

5. The combination, with the upper guide for the wire provided with a cutter-slide and its spring, of the elbow-lever having one arm arranged in the path of the projecting end of said slide, and the rod, lever, and cam which actuates said elbow-lever, substantially as set forth.

6. The combination, with reciprocating guides for the wires, of the primary twister for uniting the same between the upper and lower guides, said twister consisting of the tubular shaft rotating concentrically about the guides, the elbow-lever 41, mounted on said shaft, the twisting-blades 42, carried by said lever, the spring which actuates said blades, and the cam and lever, whereby the blades are retracted, substantially as set forth.

7. The combination, with the shaft 38, the elbow-lever 41 carried thereby, the twisting-blades 42, carried by said lever, the spring which actuates said blades, the pinion 39 on said shaft, the wheel 127 gearing with said pinion, the pinion 126, ratcheted to wheel 127, the rack that drives the pinion 126, the lever 43, which retracts the twister-blades, provided with a keeper-notch to engage the arm of the elbow-lever 41, and the cam which actuates the lever 43, substantially as set forth.

8. The combination, with the upper guide, 14, and lower guide, 17, of the rod 23, connected to the upper guide, the connecting-rod 26, coupling said rod to the cam-lever, said cam-lever, the cam which actuates said lever, the rack 31, connected with rod 23, the rack 29 on the guide 17, and the toothed wheel 30, rotatively mounted in the frame and gearing on its opposite sides with the said racks 29 and 31, whereby the upper and lower guides are moved simultaneously in opposite directions.

9. The combination, with the two wire-guides forming a pair, arranged side by side and provided with racks, of the two connected pinions 33 and 33°, of different diameters, gearing with the respective racks on the guides, whereby the movement of one guide of the pair imparts to the other guide a movement in the same direction, but at a different rate of speed.

10. In a bottle-wiring machine, the lower wire-guides, each provided with a clamp for the wire, substantially as set forth.

11. The combination, with the lower wire-guide, 17, provided with a longitudinal passage for the wire, of the clamp-jaw 18, arranged to bear on the wire, its spring 19, the loose pin 20, and the other lower wire-guide, 17', provided with a cam-like projection, 22, arranged to stand under said pin 20 when the two guides stand at the same elevation, substantially as set forth.

12. The combination, with the pair of wire-guides, each guide being provided with a rack on its face, of the frame 32, embracing said guides, the connected pinions 33 33°, frictionally mounted in said frame and gearing with the respective racks, said pinions having different diameters, and the machine-frame G, loosely embracing said frame 32, so as to permit the guides to carry the frame and pinions a limited distance, substantially as set forth.

13. The combination, with the wire-feeding wheels 1 1', provided with gears 13 13', respectively, said gears having different diameters, of the rack 6, the wheel 5, gearing therewith, the shaft 4, the wheel 8 on said shaft, provided with a pawl, 9, the sleeve 11 on the shaft 4, the gears 12 12', fixed on said sleeve and gearing, respectively, with said gears 13 13', and the ratchet-wheel 10, fixed on said sleeve 11 and engaged by said pawl, substantially as set forth.

14. In a bottle-wiring machine, the device for placing or applying the band about the neck of the bottle, consisting of a reciprocating carriage, a pair of forked placing-fingers, 50 50, mounted in sliding bearings in said carriage and provided with a spring, 51, and a shoulder, 49', a pair of forked fingers, 52 52, fulcrumed on short levers 53 53, pivoted on the carriage, the said short levers having their tails arranged in the path of the shoulder 49', a spring arranged between the tails of the fingers 52, and the retracting-springs 54 54, all arranged to operate substantially as set forth.

15. The combination, with the wire-guides and the primary twister which form the wire band, the axis of said guides being at right angles to the axis of the bottle in the machine, of clamps for holding the bottle while it is being wired, the band-placer X, adapted to place the formed band about the bottle-neck, and a secondary twister arranged opposite the band-placer, which closes the band about the bottle-neck, substantially as set forth.

16. A twister for closing the band, consisting of a rotating tubular shaft, 58, two jaws, 60 and 60', hinged to the end of said shaft and provided with teeth, as described, to embrace the wires, and one of said jaws provided with a tooth which takes between the wires, the slide-rod 61 in shaft 58, and the device attached to rod 61 for actuating said jaws, said device comprising a spreader between the jaws, and rollers or blocks 63 63', bearing on the exterior faces of the respective jaws and connected to said slide-rod, substantially as set forth.

17. In a bottle-wiring machine, a support and holder for the bottle, consisting of a reciprocating slide mounted on the machine-frame, a bearing-clamp which embraces the body of the bottle elastically, and a reciprocating carriage mounted in the machine-frame and bearing a clamp that embraces the bottle-neck elastically, said carriages being capable of movement to a limited extent independent of each other, whereby the bottle-neck is moved through the neck-clamp by the body-clamp, as and for the purposes set forth.

18. The combination, with the reciprocating carriage 100, of the reciprocating carriage 116, the rod 101, secured to the carriage 100, provided with collars 117 and 117' and playing through a lug on the carriage 116, said lug being arranged between said collars, the spring-actuated clamp mounted on carriage 100, and the spring-actuated clamp for the bottle-neck mounted on the carriage 116, substantially as set forth.

19. The combination, with the carriage 100, of the lateral jaws 106 106', pivoted thereon, the sliding jaw 106'', the shaft 107', the wheel 107, fixed thereon, the links 108 108', coupled at one end to the respective jaws 106 106' and at the other end to the wheel 107, the disk 110, carried by the wheel 107, the link 108'', coupling the jaw 106'' to said disk, and the spring 111, which sets the jaws of the clamp, substantially as set forth.

20. The combination, with the carriage 116, the jaws 118, mounted thereon, the connected knuckle-levers which actuate said jaws simultaneously, the arm 119', connected with one of said levers and coupled to the rod 120, the said rod, and the spring 121 thereon, which closes said jaws, substantially as set forth.

21. The combination, with the carriage 100, the jaws of the clamp thereon, the gear-wheel 107, the links connecting said wheel with the jaws, the spring that closes the jaws, and the mechanism which opens the jaws, consisting of the long pinion 112, rotatively mounted in the frame and gearing with wheel 107, the segment-rack gearing with said pinion, the lever 114, and the operating-cam, substantially as set forth.

22. The combination, with the cam 113, the lever 114, the rack 115, the long pinion 112, gearing with said rack, its shaft 112', provided with a crank, 112'', the carriage 116, the jaws of the neck-clamp mounted therein and their knuckle-levers, the slide-rod 120, coupled to the knuckle-levers and provided with a pin, 120', and the spring on rod 120, whereby, when the carriage 116 is drawn back, the pin 120' may be engaged by crank 112'' for releasing the clamp, as set forth.

23. In a bottle-wiring machine, the combination, with a clamp that holds the bottle and a movable carriage on which said clamp is mounted, of pushers on said carriage elastically embracing the neck of the bottle, said pushers being adapted and arranged to push the strands of the wire up over the fillet on the bottle, as set forth.

24. The combination, in a bottle-wiring machine, of a movable holder for the bottle, carrying forked pushers to engage the radial branches or strands of wire, said pushers elastically embracing the bottle-neck, and the movable crown or crown-twister serving as an abutment to stop the movement of the bottle while the said pushers are in action, as set forth.

25. The combination, with the carriage 116 and the neck-clamp mounted thereon, of the pushers 122, hinged to the jaws of the neck-clamp and provided with suitable springs, 122', substantially as set forth.

26. The combination, with the carriage 116, and the neck-clamp mounted thereon, of the spring-supported guide 123, mounted on said carriage.

27. In a bottle-wiring machine, the means for gathering the wires over the cork and to the center of the same, said means consisting of the casing, as 73, having a face-plate with slots to receive and guide the wires, which stands near the end of the cork, pushers, as 122, which push the wires up over the fillet and into said slots, and vibrating gatherers, as 75, which play in said slots and bunch the gathered wires at the center of the cork, all combined substantially as set forth.

28. The combination, with the rotatively-mounted casing, as 73, having radial slots in its face-plate to receive the wires, of the vibrating gatherers that play in said slots, the movable twisting-jaws in said casing that clamp on the wires, and the movable cutters that sever the twist, also mounted in said casing, substantially as set forth.

29. The crown-twister having its shaft mounted to rotate in swinging arms, whereby a lateral motion may be imparted to said twister in order to flatten the twist upon the cork.

30. The combination, with the casing 73, having a radially-slotted face-plate, of the gatherers 75, arranged to play in said slots and provided with gear-teeth at their pivoted ends, the tubular shaft of the casing, the slide-bar 76, arranged within said shaft and having a rack or racks on its inner end engaging the teeth on the gatherers, the spring which retracts the gatherers, and the cam and lever which actuate said gatherers through the bar 76, substantially as set forth.

31. The combination, with the bar 69, mounted loosely in suitable bearings, and the bearing-brackets 70, fixed to said bar, of the shaft 71, mounted rotatively in said bearings and provided with a pinion, 84, the casing 73 on the end of said shaft 71, the rocking lever 91, whereby said casing is moved or swung laterally, the lever 72, coupled to bar 69, whereby endwise movement is imparted to the casing, and the sector 85, gearing with pinion 84, substantially as set forth.

32. The combination, with the slotted shaft, as 58, of the secondary twister and the twisting-jaws hinged thereon, the jaw-actuating slide-rod, as 61, within said shaft, the slide 65', pinned thereto and sliding on shaft 58, the operating-slide 67, mounted on slide 65', and the cushion-spring 67', whereby the jaws of the twister are made to clamp the wires elastically, for the purpose set forth.

33. In a bottle-wiring machine, the combination, with two pairs of movable wire-guides which separate and thus expose the middle portions of the wires, in which the uniting-twists are formed, of mechanism, substantially as described, for actuating said guides, a primary twister which forms simultaneously the two uniting-twists in the wires between the ends of said guides, and mechanism, substantially as described, for actuating said twister.

34. In a bottle-wiring machine, the combination, with two pairs of movable wire-guides which separate and expose the middle parts of the wires by their movement thereon, of mechanism, substantially as described, for actuating said guides, a twister for simultaneously forming two twists in the exposed portions of the wires, said twister comprising two united blades adapted to embrace the wires and rotating about the latter, and mechanism, substantially as described, for actuating said twister, as set forth.

In witness whereof I have hereunto signed my name in the presence of two subscribing witnesses.

ANDREW CAMPBELL.

Witnesses:
 HENRY CONNETT,
 J. D. CAPLINGER.